(12) United States Patent
Shah Khadri et al.

(10) Patent No.: US 12,679,563 B2
(45) Date of Patent: Jul. 14, 2026

(54) MODULAR CONFIGURATION OF LAUNCH VEHICLE SYSTEM

(71) Applicant: AGNIKUL COSMOS PRIVATE LIMITED, Chennai (IN)

(72) Inventors: Syed Peer Mohamed Shah Khadri, Chennai (IN); Srinath Ravichandran, Chennai (IN)

(73) Assignee: AGNIKUL COSMOS PRIVATE LIMITED, Chennai (IN)

( * ) Notice: Subject to any disclaimer, the term of this patent is extended or adjusted under 35 U.S.C. 154(b) by 0 days.

(21) Appl. No.: 18/707,147

(22) PCT Filed: Sep. 1, 2022

(86) PCT No.: PCT/IN2022/050780
§ 371 (c)(1),
(2) Date: May 2, 2024

(87) PCT Pub. No.: WO2023/031967
PCT Pub. Date: Mar. 9, 2023

(65) Prior Publication Data
US 2025/0026498 A1 Jan. 23, 2025

(30) Foreign Application Priority Data
Sep. 2, 2021 (IN) .............................. 202141039671

(51) Int. Cl.
*B64G 1/22* (2006.01)
*B64G 1/00* (2006.01)

(52) U.S. Cl.
CPC ............. *B64G 1/223* (2023.08); *B64G 1/008* (2023.08)

(58) Field of Classification Search
CPC ................................. B64G 1/223; B64G 1/008
See application file for complete search history.

(56) References Cited

U.S. PATENT DOCUMENTS

| | | | |
|---|---|---|---|
| 4,231,537 A | 11/1980 | Lyons | |
| 5,799,902 A * | 9/1998 | Keith ..................... | B64G 1/645 244/172.3 |

FOREIGN PATENT DOCUMENTS

EP 0508609 A2 10/1992

* cited by examiner

*Primary Examiner* — Valentina Xavier

(57) ABSTRACT
The present invention relates to a modular configuration of the launch vehicle system. More specifically, it relates to the modular configuration technology developed to optimise the launch vehicle with respect to the number of engines in the lower stage or the number of stages itself in order to get a most efficient launch possible for a particular payload being launched. In the present invention the vehicle is such that the modularity is passed down to sub-system level which thereby reduces the mass of unused components and the modifiable cluster can be used as a booster unit to carry heavier payloads to higher orbits. Depending upon the mass of the payload to be carried to a particular orbit, either the number of stages or the number of engines, are either attached or removed from the vehicle and thus increasing the efficiency of the trajectory. The present invention reduces the time and cost involved in reconfiguration as well.

6 Claims, 3 Drawing Sheets

101

102

103

104

200

300

400

402

500

502

601

602

605

605

603

605

606

604

MODULAR CONFIGURATION OF LAUNCH VEHICLE SYSTEM

FIELD OF INVENTION

The present invention relates to the field of modular technology in launch vehicles. More particularly, it relates to the system and method for optimising the launch vehicle, with respect to either the number of engines in the lower stage or the number of stages itself, in order to achieve an efficient launch for a particular payload being launched.

BACKGROUND OF THE INVENTION

Traditional launch vehicles are huge and heavy, and their optimization for the payload is not an easy task. Launching a satellite into orbit is currently complex and expensive in all respects, including both the development and launch operation costs. Generally, payloads cover an extensive range of weights and volumes, however, only a limited number of launch vehicles are currently available for placing this wide range of payloads in earth orbit.

Another aspect of the high cost of traditional launch vehicles is due to the individual rocket engines. These traditional launch vehicles usually have a large number of interdependent components and one single engine with large thrust as opposed to multiple engines with small thrust.

Another drawback, of existing launch vehicle designs, is that they are not easily adaptable to carry payloads of various sizes. Launch missions may involve payloads of any size to be lifted to the earth orbit and hence the number of engines or the number of stages of the launch vehicle, for a particular payload being launched, must be well planned and developed.

Therefore, there is a need for launch vehicles that will easily accommodate payloads of any size and weight and at the same time be less expensive to develop, construct and operate than the present day launch vehicles. Reducing and optimising the payloads and reducing overall launch costs compared to the costs of present day launch systems.

The patent application EP0508609A2 discusses a family of modular solid-propellant launch vehicles and a related launch facility, for placing a wide range of payloads in earth orbit, at greatly reduced costs as compared to present day launch systems. The basic family of modular solid-propellant launch vehicles is constructed from only two sizes of modular solid-propellant rocket motors, a large rocket motor and a small rocket motor. The modular rocket motors are clustered and stacked in various configurations to form the family of launch vehicles. The physical as well as the performance characteristics of the two solid-propellant rocket motors, including weight, vacuum specific impulse and action time, were tailored to maximize the payload capabilities of each member of the launch vehicle family without exceeding predetermined maximum and staging dynamic pressure limits and maximum acceleration limits. The universal launch facility utilizes a steel canister that is is sized to hold the maximum diameter and length of the launch vehicle. The steel canister is secured in a concrete-lined launch pit and the vehicle is expelled from the canister by a piston. The piston is caught by an arrestor device upon reaching the end of the canister. An assembly platform at the top of the piston provides a platform for assembling the launch vehicle.

The U.S. Pat. No. 5,799,902A relates to a low-cost, liquid-propellant rocket, launch vehicle having a central pod that carries an optional final-stage rocket engine cluster, and having additional engine clusters arranged in diametrically opposed pairs of clusters. The pairs of clusters are burned and separated in a staging sequence until the final stage is reached. In the presently preferred embodiment, there are three pairs of engine clusters arranged in a hexagonal configuration about the central pod and each engine cluster contains seven identical engines. The engines are made from light-weight, low-cost materials, without gimbals or other moving parts. Steering of the vehicle is effected by differential control of the engine thrusts of selected engines, using duty-cycle modulation of a plurality of on/off propellant supply valves and, additionally, control of other on/off valves controlling the supply of an inert cryogenic fluid to secondary injection ports on the engine. An onboard gas generator provides inert gas for fluid pressurization and preferably uses, as its principal reactant, the same material used as the cryogenic fluid. Navigation is effected with inexpensive onboard systems and the entire vehicle provides a dramatic reduction in cost in comparison with conventional launch vehicles.

The U.S. Pat. No. 4,231,537A discusses how a satellite intended for insertion into a quasi-synchronous earth orbit is adapted for efficient launch by minimizing the amount of launch vehicle cargo capacity employed. The satellite includes at least one major thrust source, such as an apogee kick motor, defining a major thrust axis for the satellite. A reusable launch vehicle such as the Space Shuttle, includes a cargo bay whose largest dimension is parallel to the launch vehicle thrust axis. Minimizing satellite use of cargo bay capacity is obtained by adapting the satellite to lie within the cargo bay of the launch vehicle with its thrust axis perpendicular to the thrust axis of the launch vehicle.

The scientific literature titled "Modularity as an Enabler for a More Efficient Commercial Small Satellite Program" by Jenny Kingston Space Systems Research Fellow, School of Engineering discusses the key requirements for a commercial small satellite platform, and the specific problems encountered in effectively adapting it to a range of mission types. A modular concept is proposed, which may be reconfigured to more closely match the requirements of each specific mission, whilst minimising the required redesign time and associated cost. This concept enables a programmatic approach where the level of a priori design, manufacture, and test of the platform is maximised. The benefits offered by this approach are shown to be the ability of the platform supplier to respond more rapidly and competitively to contract bids, coupled with a significant reduction in spacecraft delivery times.

The scientific literature titled "Soho: A modular spacecraft concept to allow flexible payload integration and efficient development" by M Bouffard, J et al discusses on how a modular design can allow to manage the multiple and complex interfaces of such a spacecraft. First of all, a recall of the scientific goals of the payload instruments with associated constraints is made. Then the overall mission implementation is described and the main design features are detailed, to show how a great flexibility can be offered, in the design and development of the spacecraft.

However, none of the prior-arts discuss modular configuration technology to optimise the launch vehicle with respect to number of engines in the lower stage or the number of stages itself in order to get a most efficient launch possible for a particular payload being launched.

The present invention tries to overcome the disadvantages existing in the prior art and provide a vehicle such that modularity is passed down to the sub-system level, thereby reducing the mass of unused components. This reduced amount of hardware of unused components m the modular design, adds to the reduction in overall cost as well. The Modular design of the launch vehicle reduces the time needed to redesign the new configuration of the vehicle and leads to frequent launches with a maximum of two to three weeks time span between consecutive launches.

OBJECTIVE OF THE INVENTION

The primary objective of the present invention is to provide a system using modular configuration technology to optimise the launch vehicle, with respect to either the number of engines in the lower stage or the number of stages itself, in order to get the most efficient launch possible for a particular payload being launched.

Another objective of the present invention is to provide a vehicle wherein the modularity is passed down to a sub-system level, and thereby reducing the mass of unused components.

Another objective of the present invention is to provide a modular design of the launch vehicle that reduces the time needed to redesign the new configuration of the vehicle and that leads to frequent launches with a maximum of two to three weeks time span between consecutive launches.

Another objective of the present invention is to provide a system wherein depending on the mass of the payload to be carried to a particular orbit, either the number of stages or number of engines, are either attached or removed from the vehicle, and the vehicle is flown. Thus, modifying the configuration is as easy as plug and play.

Another objective of the present invention is enabling reduction in mass of the launch vehicle thereby improving the efficiency at low cost and less time, easing the assembly process, creating room for configurability and flexibility in design, and allowing improvisation based on the customer as well as payload requirement.

Yet another objective of the present invention provides a provision wherein the modularity of the vehicle reduces the time needed to design the optimised vehicle for a given mission. It helps in reducing the cost of the mission by reducing the overall mass of the vehicle.

SUMMARY OF THE INVENTION

The present invention relates to modularity of the launch vehicle brought in either by using a clustered engine configuration in the launch vehicle or by changing the number of stages in the vehicle.

In one aspect of the present invention, the design of the launch vehicle assembly through system and subsystem level brings in modular geometry in all levels of the launch is vehicle.

In another aspect of the present invention, the number of stages can be reduced in order to make the vehicle lighter and even more efficient.

In another aspect of the present invention, the time and cost involved in reconfiguration, and qualification is lesser than that involved in redesigning a new efficient vehicle for a given payload. Modular vehicle design increases the efficiency of the trajectory, thereby reducing the overall cost of the mission.

In another aspect of the present invention, the number of engines that are not used in the current mission is saved for the next mission thereby reducing the time, cost and effort needed in assembling a new vehicle.

BRIEF DESCRIPTION OF THE DRAWINGS

So that the manner in which the above recited features of the present invention are understood in detail, a more particular description of the invention, briefly summarized above, may have had reference to embodiments, some of which are illustrated in the appended drawings.

However, it is to be noted that the appended drawings illustrate only typical embodiments of this invention and are therefore not to be considered as limitation of its scope, for the invention may admit to other equally effective embodiments.

REFERENCE NUMERALS

101—7 engine configurations of the booster stage;
102—6 engine configurations of the booster stage;
103—5 engine configurations of the booster stage;
104—4 engine configurations of the booster stage;
200—3-stage launch vehicle;
300—2-stage launch vehicle;
400—first stage added as boosters;
500—booster stage with 6 strap-ons boosters;
601—sample configurations with 4 engines in each of the 6 strapon boosters and 7 engines in the core booster (4-4-4-7-4-4-4);
602—the sample configuration with 5 engines in each of the 6 strapon boosters and 7 engines in the core booster (5-5-5-7-5-5-5);
603—the sample configuration with 6 engines in each of the 6 strapon boosters and 7 engines in the core booster (6-6-6-7-6-6-6);
604—the sample configuration with 7 engines in each of the 6 strapon boosters and 5 engines in the core booster (7-7-7-5-7-7-7);

DETAILED DESCRIPTION OF THE INVENTION

The following invention disclosure illustrates various embodiments

Figure 1:
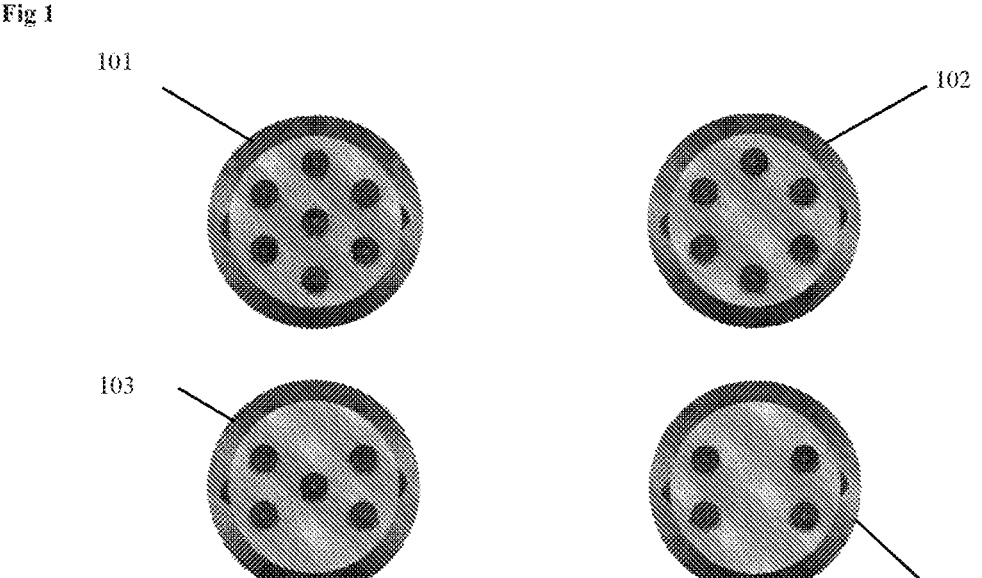
FIG. 1 illustrates the different engine configurations of the present invention.
Figures 6, 7:
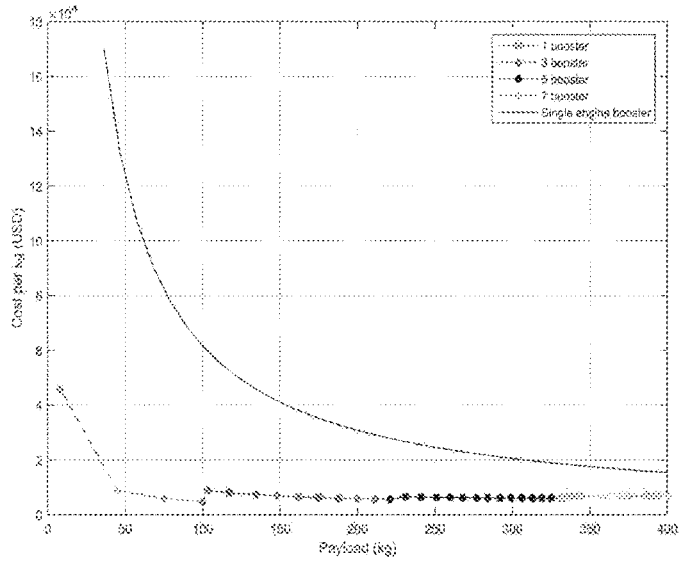
FIG. 6 illustrates few of the possible configurations with varying number of engines in the first stage of the present invention.
FIG. 7 illustrates the variation of cost per kg (in USD) with the payload mass.

The principles of the present invention and their advantages are best understood by referring to FIG. 1 and FIG. 7. In the following detailed description of the illustrative or exemplary embodiments of the disclosure, specific embodiments in which the disclosure may be practiced are described in sufficient detail to enable those skilled in the art to practice the disclosed embodiments.

The following detailed description is, therefore, not to be taken in a limiting sense, and the scope of the present disclosure is defined by the appended claims and equivalents thereof. References within the specification to "one embodiment," "an embodiment," "embodiments," or "one or more embodiments" are intended to indicate that a particular feature, structure, or characteristic described m connection with the embodiment, is included in at least one embodiment of the present disclosure.

FIG. 1 is the illustration of the cluster 7,6,5,4 engine configurations (101, 102, 103, 104). Cluster of engines consists of 7 engines, placed in a certain configuration to be able to perform all necessary maneuvers to reach the orbit with the least amount of energy. Modularity in the launch vehicle's clustered engine configuration involves removing one or more engines to make the vehicle efficient according to the particular mission, keeping other system level components intact.

Figure 2:
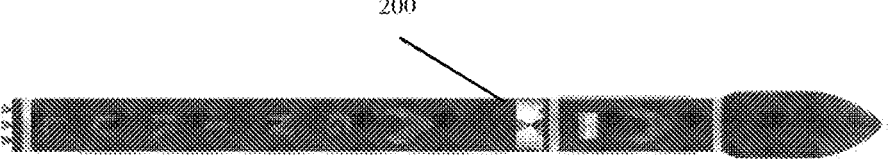
FIG. 2 illustrates the 3-stage launch vehicle of the present invention.
Figure 3:
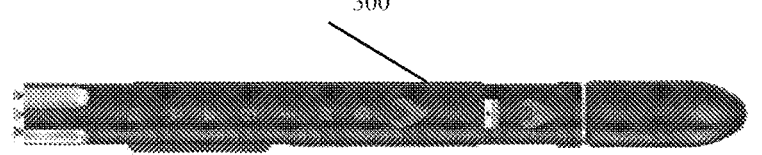
FIG. 3 illustrates the 2-stage launch vehicle of the present invention.

A multistage configuration in a satellite launch vehicle is necessary to achieve the desired orbit efficiently. In general, a 3-stage vehicle (200) would be able to carry higher payload compared to a 2-stage vehicle (300). Hence depending on the mass of the payload to be carried, modularity in satellite launch vehicle involves modification in the number of stages as illustrated in FIG. 2 and FIG. 3.

Figure 4:
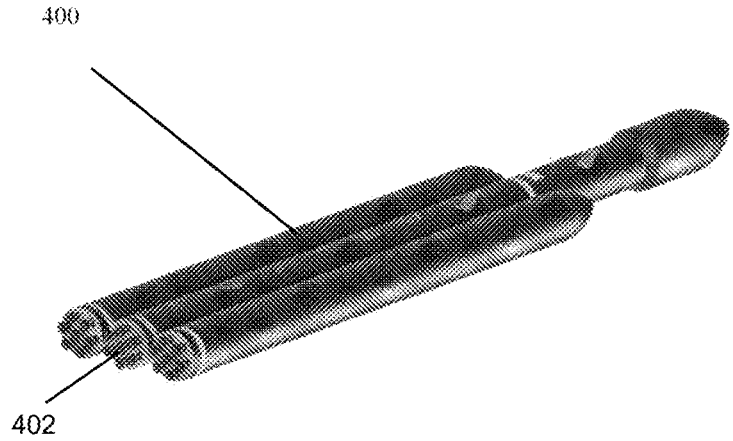
FIG. 4 illustrates the first stage added as boosters.

Modularity also allows adding the first stage of the vehicle as side boosters (400) around the core boosters (402), as shown in FIG. 4. Modifying the vehicle according to the payload involves changes to its attached system level components such as engines and stages, and to its sub system levels such as plumbing lines, computers and other electronic hardware. Thus, modularity in system and subsystem level assembly is maintained while designing each component of the vehicle.

Figure 5:
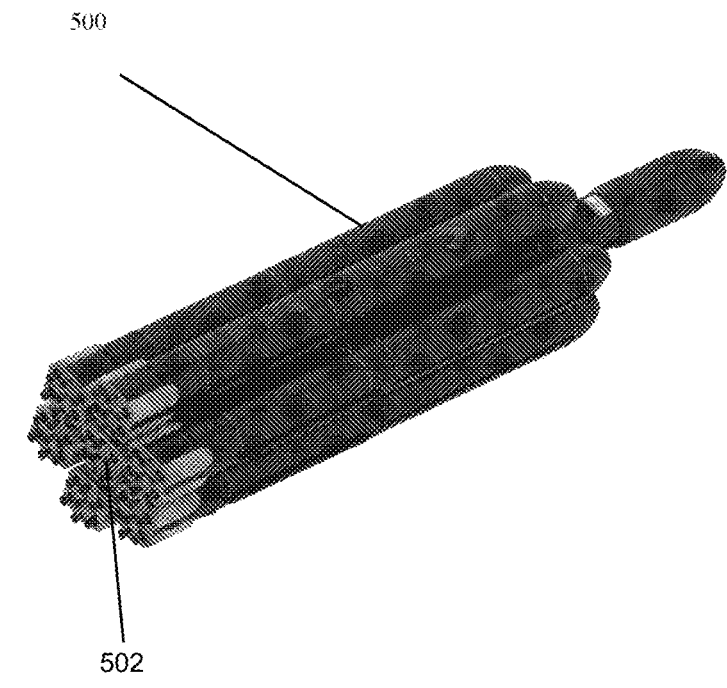
FIG. 5 illustrates the booster stage with 6 strap-ons boosters.

Modularity is also brought in by adding strapon boosters (500) as in FIG. 5. This figure illustrates the launch vehicle with the added up to six strapon boosters along with the core booster (502). This allows modularity for the payload in the higher mass range. With a maximum of 49 engines in the booster stage, the cluster of engines may exhibit various combinations depending on the payload mass and be able to perform all necessary maneuvers to reach the desired orbit with the least amount of energy. Modularity in the satellite launch vehicle's clustered engine configuration in the booster stage involves removing one or more engines from any of the strapon boosters or the core booster itself to make the vehicle best suited to the payload and the orbit for the particular mission, keeping other system level components intact.

FIG. 6 illustrates a few possible configurations with varying numbers of engines in the core as well as strapon boosters. Three sample configurations exhibit the core booster (605) having the maximum of 7 engines and the strapon boosters having 4 engines (601), 5 engines (602) and 6 engines (603) in each configuration respectively. Yet another sample depicts the core booster (606) having a lesser number of engines of quantity 5, and the strapon boosters having 7 engines each (604). A total number of 38 such configurations are possible in this manner as depicted in Table. 1.

TABLE 1

| Second Stage: N engines | 1 booster configuration | 3 booster configurations | 5 booster configurations | 7 booster configurations |
|---|---|---|---|---|
| 4 | 4 | NP | NP | NP—Not Possible |
| 5 | 5 | NP | NP | NP |
| 6 | 6 | NP | NP | NP |
| 7 | 7 | NP | NP | NP |
| 8 | NP | NP | NP | NP |
| 9 | NP | NP | NP | NP |
| 10 | NP | NP | NP | NP |
| 11 | NP | NP | NP | NP |
| 12 | NP | 4 + 4 + 4 | NP | NP |
| 13 | NP | 4 + 5 + 4 | NP | NP |

TABLE 1-continued

| Second Stage: N engines | 1 booster configuration | 3 booster configurations | 5 booster configurations | 7 booster configurations |
|---|---|---|---|---|
| 14 | NP | 4 + 6 + 4; 5 + 4 + 5 | NP | NP |
| 15 | NP | 5 + 5 + 5; 4 + 7 + 4 | NP | NP |
| 16 | NP | 5 + 6 + 5; 6 + 4 + 6 | NP | NP |
| 17 | NP | 5 + 7 + 5; 6 + 5 + 6 | NP | NP |
| 18 | NP | 6 + 6 + 6; 7 + 4 + 7 | NP | NP |
| 19 | NP | 6 + 7 + 6; 7 + 5 + 7 | NP | NP |
| 20 | NP | 7 + 6 + 7 | 4 + 4 + 4 + 4 + 4 | NP |
| 21 | NP | 7 + 7 + 7; | 4 + 4 + 5 + 4 + 4 | NP |
| 22 | NP | NP | 4 + 4 + 6 + 4 + 4 | NP |
| 23 | NP | NP | 4 + 4 + 7 + 4 + 4 | NP |
| 24 | NP | NP | 5 + 5 + 4 + 5 + 5 | NP |
| 25 | NP | NP | 5 + 5 + 5 + 5 + 5 | NP |
| 26 | NP | NP | 5 + 5 + 6 + 5 + 5 | NP |
| 27 | NP | NP | 5 + 5 + 7 + 5 + 5 | NP |
| 28 | NP | NP | 6 + 6 + 4 + 6 + 6 | 4 + 4 + 4 + 4 + 4 + 4 + 4 |
| 29 | NP | NP | 6 + 6 + 5 + 6 + 6 | 4 + 4 + 4 + 5 + 4 + 4 + 4 |
| 30 | NP | NP | 6 + 6 + 6 + 6 + 6 | 4 + 4 + 4 + 6 + 4 + 4 + 4 |
| 31 | NP | NP | 6 + 6 + 7 + 6 + 6 | 4 + 4 + 4 + 7 + 4 + 4 + 4 |
| 32 | NP | NP | 7 + 7 + 4 + 7 + 7 | NP |
| 33 | NP | NP | 7 + 7 + 5 + 7 + 7 | NP |
| 34 | NP | NP | 7 + 7 + 6 + 7 + 7 | 5 + 5 + 4 + 5 + 5 + 5 |
| 35 | NP | NP | 7 + 7 + 7 + 7 + 7 | 5 + 5 + 5 + 5 + 5 + 5 |
| 36 | NP | NP | NP | 5 + 5 + 6 + 5 + 5 + 5 |
| 37 | NP | NP | NP | 5 + 5 + 7 + 5 + 5 + 5 |
| 38 | NP | NP | NP | NP |
| 39 | NP | NP | NP | NP |
| 40 | NP | NP | NP | 6 + 6 + 6 + 4 + 6 + 6 + 6 |
| 41 | NP | NP | NP | 6 + 6 + 6 + 5 + 6 + 6 + 6 |
| 42 | NP | NP | NP | 6 + 6 + 6 + 6 + 6 + 6 + 6 |
| 43 | NP | NP | NP | 6 + 6 + 6 + 7 + 6 + 6 + 6 |
| 44 | NP | NP | NP | NP |
| 45 | NP | NP | NP | NP |
| 46 | NP | NP | NP | 7 + 7 + 7 + 4 + 7 + 7 + 7 |
| 47 | NP | NP | NP | 7 + 7 + 7 + 5 + 7 + 7 + 7 |
| 48 | NP | NP | NP | 7 + 7 + 7 + 6 + 7 + 7 + 7 |
| 49 | NP | NP | NP | 7 + 7 + 7 + 7 + 7 + 7 + 7 |

Modularity of the launch vehicle is brought in cither by using a clustered engine configuration in the launch vehicle or by changing the number of stages in the vehicle. The innovative design of the launch vehicle assembly through system and subsystem level brings in modular geometry in all levels of the launch vehicle.

The number of engines are determined based on the payload being carried, resulting in reduction of overall mass of the vehicle. Mass of the payload is determined based on the type (1 U, 3 U or 6 U, 12 U or 16 U) and number of satellites required to inject into the orbit. The configuration of the vehicle is chosen to carry the mass of the payload to the desired orbit desired.

In addition, if needed, the number of stages can also be reduced in order to make the vehicle lighter and even more efficient.

The present invention is built on high levels of modularity. The vehicle can be assembled using multiple numbers of the same engine depending upon the mass of the payload to be launched. As the current core booster design can be flown with 4/5/6/7 engine configurations in the booster stage, the N-booster stage can be strapped-on together to get a wide range of payload capabilities. FIG. 7 depicts the variation of the cost per kilogram (in USD) with respect to the payload mass. With increasing payload masses, the engine cluster can be modified to address the extra mass by adding proportional number of engines, yet keeping low cost per kg.

FIG. 7 also illustrates the cost variation of a Single booster engine stage for comparison with the cost of modular design. The cost increment per kg with respect to the payload for the modular design configuration is much lower as compared to single engine booster configuration. The possible configurations are listed in the Table. 1. With a total of possible configurations the current invention can offer a wide payload range at a similar cost per kg.

The engine control hardware consists of two modules that will perform all the engine functions such as ignition, shutdown, mixture ratio control and thrust vector control for gimbaling. The pump motors are controlled by a separate electronics module and reported to the engine control module. The electronic hardware is specific for an engine, which results in no redundant hardware left on the vehicle when a particular engine is removed.

Time and cost involved in reconfiguration and qualification is lesser than that in redesigning a new efficient vehicle for a given payload. Modular vehicle increases the efficiency of the trajectory, thereby reducing the overall cost of the mission. The modifiable cluster can be used as a booster unit to carry heavier payloads to higher orbits.

The present invention provides a means for enabling the modular design of the launch vehicle to optimise the mass of the vehicle being flown. The vehicle can be fully optimised specifically for a particular launch, bringing down the cost of the mission. The present invention enables reducing the electronic and mechanical components used in functioning of engines.

In one embodiment, the system of the present invention achieves optimization of the trajectory in parallel to the configuration, thus reducing the amount of the propellant needed and the assembly and qualification time of new configuration.

The modularity of the vehicle reduces the time needed to design the optimised vehicle for a given mission.

While the foregoing written description of the invention enables one of ordinary skill to make and use what is considered presently to be the best mode thereof those of ordinary skill will understand and appreciate the existence of variations, combinations, and equivalents of the specific embodiment, method, and examples herein. The invention should therefore not be limited by the above described embodiment, method, and examples, but by all embodiments and methods within the scope of the invention as claimed.

We claim:

1. A modular configuration of a launch vehicle system, comprising:
   a core booster, and one or more strapon boosters, wherein the one or more strapon boosters are configured to attach with the core booster, wherein the number of strapon boosters selectable and ranges from 1 to 6, wherein the core booster and each of the one or more strapon boosters comprises an engine cluster, wherein each engine cluster comprises two or more engines, wherein the number of engines in each engine cluster ranging from 2 to 7, wherein the engine clusters are placed in a predetermined configuration in the core booster, and in the one or more strapon boosters, wherein the launch vehicle system comprises a plurality of vehicle stages comprising a first stage comprising the core booster and the one or more strapon boosters, and a second/upper stage to carry a payload to an orbital trajectory; and
   engine control hardware for launching and removing one or more engines,
wherein the launch vehicle system is dynamically configured by (i) selectively adding or removing one or more engines in at least one of the core booster, or the one or more strapon boosters based on the payload to be launched, (ii) changing the number of stages in the plurality of vehicle stages by adding or removing one or more stages of the launch vehicle system according to the payload mass to be launched, and (iii) optimizing sub-system level components comprising plumbing lines, computers, and electronic hardware, to reduce the mass of unused system components, and the engine cluster exhibits one or more combinations depending on the payload mass to perform trajectory manoeuvres of the launch vehicle system to reach the orbit with the least amount of energy.

2. The Modular configuration of the launch vehicle system as claimed in claim 1, wherein the engine clusters configuration involves removing one or more engines according to the particular mission, keeping other system level and sub-system level components intact.

3. The Modular configuration of the launch vehicle system as claimed in claim 1, wherein the plurality of vehicle stages comprises a plurality of additional upper stages and wherein the first stage of the launch vehicle system is added as side boosters.

4. The Modular configuration of the launch vehicle system as claimed in claim 1, wherein the launch vehicle system consists of a maximum of 49 engines in the booster stage.

5. The Modular configuration of the launch vehicle system as claimed in claim 1, wherein the engine control hardware consists of two modules that perform all the engine functions such as ignition, shutdown, mixture ratio control and thrust vector control for gimbaling.

6. The Modular configuration of the launch vehicle system as claimed in claim 1, wherein the electronic hardware is specific for an engine, which results in no redundant hardware left on the vehicle when a particular engine is removed.

* * * * *